US010248098B2

(12) United States Patent
Park

(10) Patent No.: US 10,248,098 B2
(45) Date of Patent: Apr. 2, 2019

(54) PLC APPARATUS

(71) Applicant: LSIS CO., LTD., Gyeonggi-do (KR)

(72) Inventor: Chang-Woo Park, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 200 days.

(21) Appl. No.: 15/171,824

(22) Filed: Jun. 2, 2016

(65) Prior Publication Data

US 2016/0357168 A1  Dec. 8, 2016

(30) Foreign Application Priority Data

Jun. 2, 2015 (KR) ........................ 10-2015-0077701

(51) Int. Cl.
*G05B 19/05* (2006.01)

(52) U.S. Cl.
CPC .................. *G05B 19/058* (2013.01)

(58) Field of Classification Search
CPC .... G05B 19/048; G05B 19/05; G05B 19/054; G05B 19/056; G05B 19/058
See application file for complete search history.

(56) References Cited

U.S. PATENT DOCUMENTS

| 5,019,760 A * | 5/1991 | Chu ........................ G01K 1/026 318/490 |
| 2003/0185271 A1* | 10/2003 | Isozumi ................... G01K 3/04 374/45 |
| 2004/0220778 A1 | 11/2004 | Imai et al. |
| 2007/0033433 A1* | 2/2007 | Pecone ................... G06F 1/305 714/6.13 |
| 2010/0146333 A1* | 6/2010 | Yong ........................ G06F 1/305 714/14 |
| 2014/0233972 A1* | 8/2014 | Sugiyama .............. G03G 15/55 399/44 |

FOREIGN PATENT DOCUMENTS

| CN | 101963937 A | 2/2011 |
| CN | 104036110 A | 9/2014 |
| KR | 10-2002-0050828 A | 6/2002 |
| KR | 10-2004-0029387 A | 4/2004 |
| KR | 10-2010-0074973 A | 7/2010 |
| KR | 10-1427618 B1 | 8/2014 |

OTHER PUBLICATIONS

Chinese Office Action for related Chinese Application No. 201610384149.3; action dated Apr. 2, 2018; (6 pages).

* cited by examiner

*Primary Examiner* — Nathan L Laughlin
(74) *Attorney, Agent, or Firm* — K&L Gates LLP

(57) ABSTRACT

Some embodiments include a PLC apparatus which is capable of predicting its life expectancy depending on an ambient temperature of the PLC apparatus. The PLC apparatus includes: an input unit through which a user inputs an ambient temperature of a PLC; a memory in which a life expectancy of a part depending on the ambient temperature is stored; a diagnosing unit configured to predict the PLC life expectancy by calculating a ratio of part life expectancy corresponding to the input ambient temperature to reference life given when the PLC is made, and compare PLC used time and the PLC life expectancy to determine whether or not the PLC used time exceeds the PLC life expectancy; and a control unit configured to control the operation of the input unit, the memory and the diagnosing unit.

4 Claims, 4 Drawing Sheets

PLC APPARATUS

CROSS REFERENCE TO RELATED APPLICATIONS

This application claims the benefit of Korean Patent Application No. 10-2015-0077701, filed on Jun. 2, 2015, entitled "PLC APPARATUS", which is hereby incorporated by reference in its entirety.

BACKGROUND

1. Technical Field

The present disclosure relates to a PLC apparatus and more particularly, to a PLC apparatus which is capable of predicting its life expectancy depending on an ambient temperature of the PLC apparatus.

2. Description of the Related Art

Automated facilities in traditional industrial sites include mechanical equipment using relays and so on. However, changing the functionalities of the automated facilities composed of the mechanical equipment had a difficulty of manually altering wirings of internal circuits of the automated facilities. A PLC (Programmable Logic Controller) is a device contrived to avoid such a difficulty.

The PLC is a logic controller which can be programmed. In general, the PLC acting as a computer receives a signal from a machine, processes the signal according to internal programmed contents, and outputs the processed signal to the machine. The PLC may be obtained by replacing the functions of control devices such as a relay, a timer, a counter and so on with semiconductor devices such as ICs (Integrated Circuits), transistors and so on. The PLC is capable of program control by an arithmetic operation function added to an essential sequence control function and performs a predetermined logic according to a program stored in its internal memory. The PLC can be applied to a variety of tasks such as device control, device numerical setting, time control, real-time monitoring, real-time data collection, safety device operation and so on.

In this way, the PLC is being widely used in a variety of industries and has different use environments. Therefore, the PLC may have different life expectancies. In addition, the PLC may be used under hot and humid environments or under cold environments. Therefore, since a user cannot correctly know a PLC available time, the user cannot confirm part exhaustion and damage until the PLC breaks down.

Although product life is in general specified in a user's manual of the PLC, since a user may not know when the PLC begins to be used, and cannot predict PLC exhaustion and breakdown in use, the overall system may have a big problem due to an unexpected to PLC breakdown.

Therefore, there is a need to predict the PLC life and take an active measure before the PLC breaks down.

SUMMARY

To overcome the above problems, it is an aspect of some embodiments of the present disclosure to provide a PLC apparatus which is capable of diagnosing a PLC life expectancy depending on a temperature and capable of informing a user whether or not PLC used time exceeds the PLC life expectancy and informing the user of PLC residual life.

The present disclosure is not limited to the above aspect and other aspects of the present disclosure will be clearly understood by those skilled in the art from the following description.

In accordance with one aspect of some embodiments of the present disclosure, a PLC apparatus which predicts a PLC life expectancy, includes: an input unit through which a user inputs an ambient temperature of a PLC; a memory in which a life expectancy of a part depending on the ambient temperature is stored; a diagnosing unit configured to predict the PLC life expectancy by calculating a ratio of part life expectancy corresponding to the input ambient temperature to reference life given when the PLC is made, and compare PLC used time and the PLC life expectancy to determine whether or not the PLC used time exceeds the PLC life expectancy; and a control unit configured to control the operation of the input unit, the memory and the diagnosing unit.

The PLC apparatus may further include an alarm unit which produces an alarm sound or alarm light. The control unit may control the alarm unit to be operated if the PLC used time exceeds the PLC life expectancy.

The diagnosing unit may predict the PLC life expectancy according to the following equation, $$L = T - 10 \times \mathrm{Log}_2 Lo/Lc$$

where, L: PLC life expectancy, T: part maximum use temperature, Lo: PLC reference life, and Lc: part life at a corresponding temperature.

The diagnosing unit may include a timer which counts the PLC used time.

The diagnosing unit may calculate PLC residual life by subtracting the PLC used time from the PLC life expectancy. The PLC apparatus may further include a display unit which displays the PLC residual life under control of the control unit.

The part may be a capacitor.

If the PLC residual life is zero, the control unit may store the point of time when the PLC residual life becomes zero, in the memory.

The PLC apparatus may further include a sensor unit which senses the ambient temperature, instead of the input unit.

According to one embodiment of the present disclosure, it is possible to diagnose a PLC life expectancy depending on a temperature and predicts PLC breakdown.

According to one embodiment of the present disclosure, it is possible to check a current PLC state in real time through an LED.

According to one embodiment of the present disclosure, since a PLC history can be utilized to trace back a time for which the PLC used time exceeds the PLC life expectancy, it is possible to perform breakdown diagnosis and system maintenance with high efficiency.

According to one embodiment of the present disclosure, when a temperature controller is incorporated in the PLC later, it is possible to automatically measure an ambient temperature without manual temperature by a user and make an automatic diagnosis on the PLC life.

DETAILED DESCRIPTION

Hereinafter, embodiments of the present disclosure will be described in detail with reference to the accompanying drawings. It should be understood that the present disclosure is not limited to the following embodiments, and that the embodiments are provided for illustrative purposes only. The present disclosure is not intended to exclude regressive disclosures in which other elements are added, altered, deleted, etc. The present disclosure encompasses other different embodiments which fall within the spirit and scope of the disclosure.

Although embodiments of the present disclosure is described with general terms which are currently being in wide use, terms arbitrarily selected by the applicant may be used for particular cases. In these cases, the meanings of the terms are described in relevant portions of the detailed description of the disclosure. Therefore, the present disclosure should be construed with the meaning of the terms, not just the name of the terms.

For example, in the following description, the term 'include(s)' is not intended to exclude other elements or steps which are not enumerated in the description.

Figure 1:
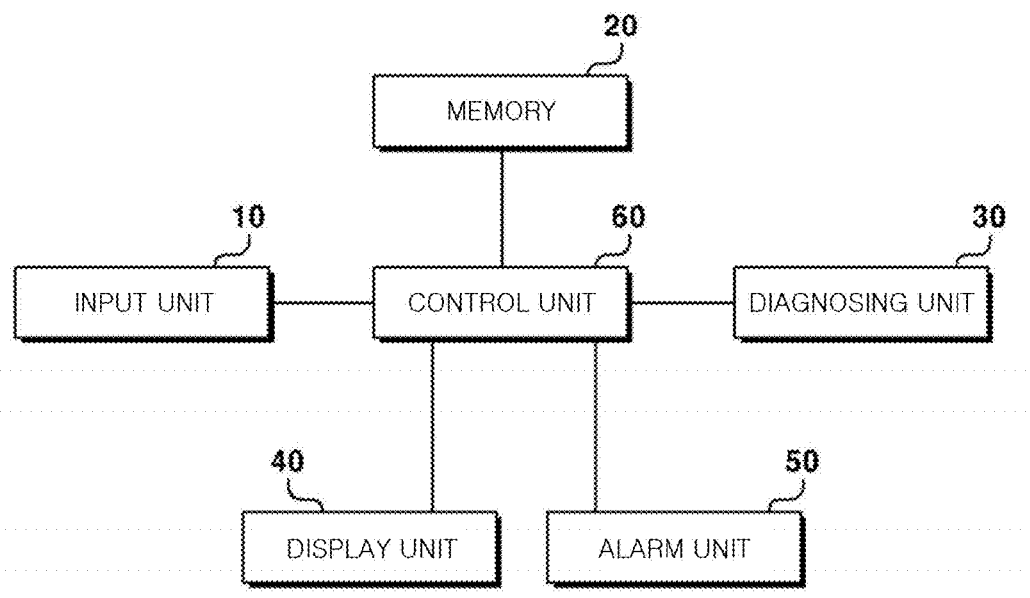
FIG. 1 is a block diagram showing the configuration of a PLC apparatus according to one embodiment of the present disclosure.

FIG. 1 is a block diagram showing the configuration of a PLC apparatus according to one embodiment of the present disclosure.

Referring to FIG. 1, a PLC apparatus includes an input unit 10, a memory 20, a diagnosing unit 30, a display unit 40, an alarm unit 50 and a control unit 60.

The input unit 10 is a means for allowing a user to input data, such as a keyboard or the like. The user can input a temperature depending on PLC use environments through the input unit 10.

Figure 3:
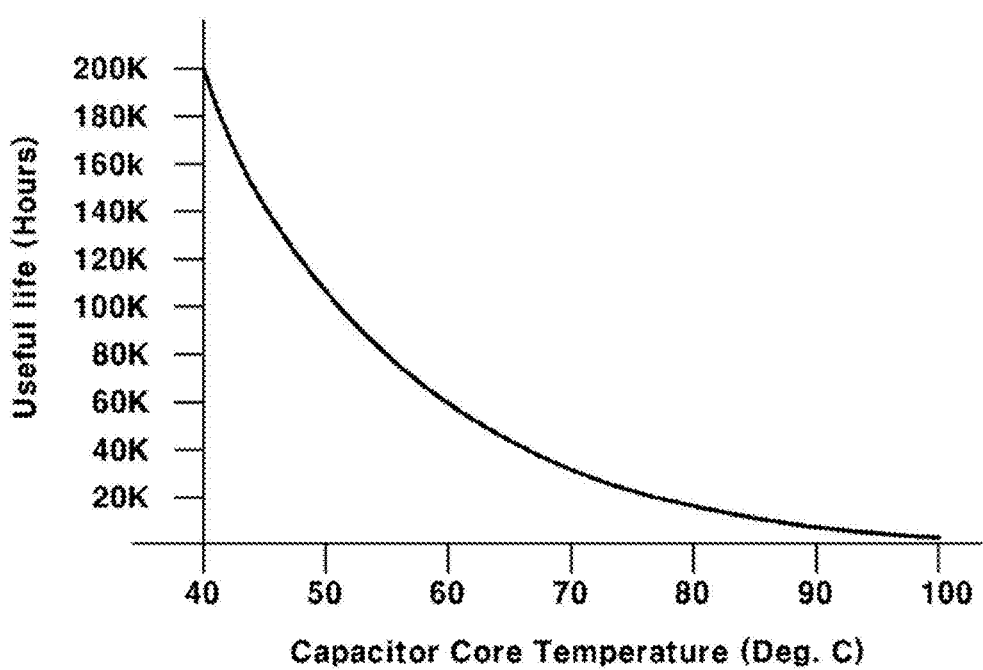
FIG. 3 is a graph showing a life expectancy depending on a change in temperature of a capacitor.

The memory 20 stores life expectancies of parts depending on the input temperature. Since parts used in the PLC have different life expectancies depending on a temperature, different part life expectancies for different temperatures are pre-stored in the memory 20. FIG. 3 illustrates a life expectancy (or useful life) depending on a change in temperature of a capacitor. As illustrated, the higher the capacitor temperature, the shorter the life expectancy. The memory 20 may be different forms of storage media such as RAM, ROM, EPROM, a flash memory and the like.

The diagnosing unit 30 predicts the life expectancy of the PLC depending on use environments based on data stored in the memory 20. That is, the PLC life expectancy is predicted under temperature environments input by the user. The PLC life expectancy is predicted by calculating a ratio of part life expectancy corresponding to the input temperature to reference life given when the PLC is made.

The PLC life expectancy is calculated according to the following equation 1.

$$L = T - 10 \times \mathrm{Log}_2 Lo/Lc \qquad [\mathrm{Eq.}\ 1]$$

where, L: PLC life expectancy, T: part maximum use temperature, Lo: PLC reference life, and Lc: part life at a corresponding temperature.

For example, assuming that a capacitor maximum use temperature T is 130° C., the PLC reference life L is 25,000 hours and a capacitor life expectancy at 55° C. is 5,000 hours, the PLC life expectancy L is about 106.8 years or about 38,975 hours. That is, the PLC life expectancy L at 55° C. is about 38,975 hours.

Then, when the PLC life expectancy is derived according to the calculation, the diagnosing unit 30 compares PLC used time and the PLC life expectancy and determines whether or not the PLC used time exceeds the PLC life expectancy. In this case, the PLC used time can be counted by a timer (not shown) which may be incorporated in the diagnosing unit 30 or may be separately formed.

If it is determined that the PLC used time exceeds the PLC life expectancy, this is notified to the user through the display unit 40 or the alarm unit 50. Through such comparison, in addition to determining whether or not the PLC used time exceeds the PLC life expectancy, it is possible to calculate residual life by subtracting the PLC used time from the PLC life expectancy. The point of time when the residual life becomes zero, that is, the point of time when the PLC used time becomes equal to the PLC life expectancy, can be stored in the memory 20.

For example, if the PLC used time exceeds the PLC life expectancy, a phrase "the warranty on PLC expires" may be displayed on the display unit 40. On the one hand, the alarm unit 50 can sound an alarm through a speaker. If the PLC used time does not exceed the PLC life expectancy, the residual life may be displayed on the display unit 40.

The control unit 60 controls the overall operation of the system, including the display unit 40 and the alarm unit 50. A device such as MPU (Microprocessor Unit) of the PLC may act as the control unit 60. For example, the point of time when the PLC used time becomes equal to the PLC life expectancy can be stored in the memory 20 under control of the control unit 60.

With the above-described configuration, the user can confirm the residual life of the PLC. In addition, if the PLC used time exceeds the PLC life expectancy, the user can be promptly notified of this fact through the display unit 40 or the alarm unit 50. Accordingly, the user can take measures such as exchanging parts before the PLC breaks down.

Figure 2:
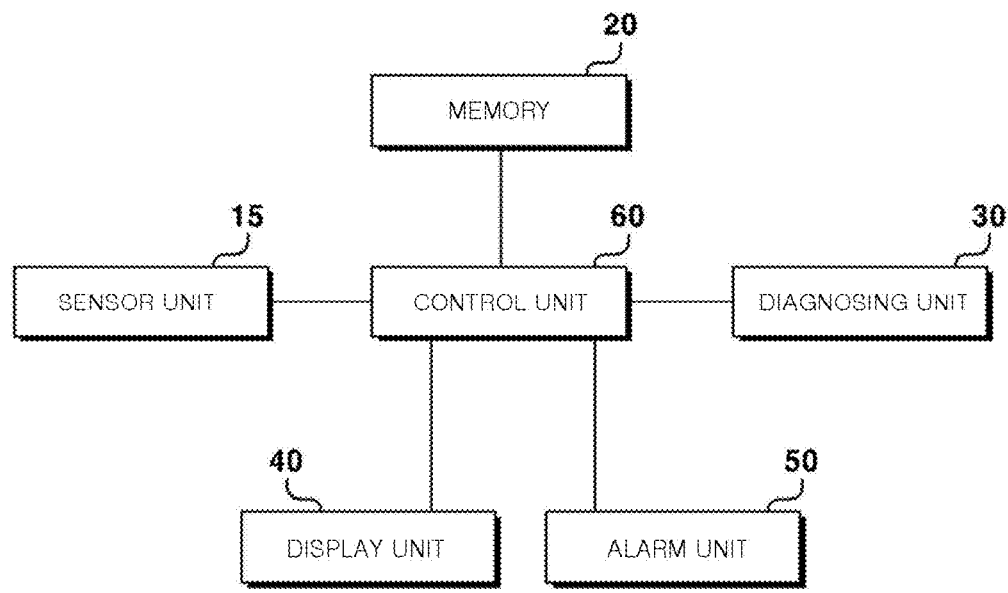
FIG. 2 is a block diagram showing the configuration of a PLC apparatus according to another embodiment of the present disclosure.

FIG. 2 is a block diagram showing the configuration of a PLC apparatus according to another embodiment of the present disclosure.

Referring to FIG. 2, a PLC apparatus according to this embodiment includes a sensor unit 15, a memory 20, a diagnosing unit 30, a display unit 40, an alarm unit 50 and a control unit 60. That is, in this embodiment, the input unit 10 in the embodiment of FIG. 1 is replaced with the sensor unit 15.

The sensor unit 15 may include one or more temperature sensors. The temperature sensors employed in this embodiment can automatically sense a temperature, while eliminating a need of manual input by a user of a temperature depending on work environments, thereby allowing the PLC life expectancy to be predicted with more convenience.

Other configurations have the same operation as those in the embodiment of FIG. 1 and, therefore, explanation of which will not repeated for the purpose of clarity.

Figure 4:
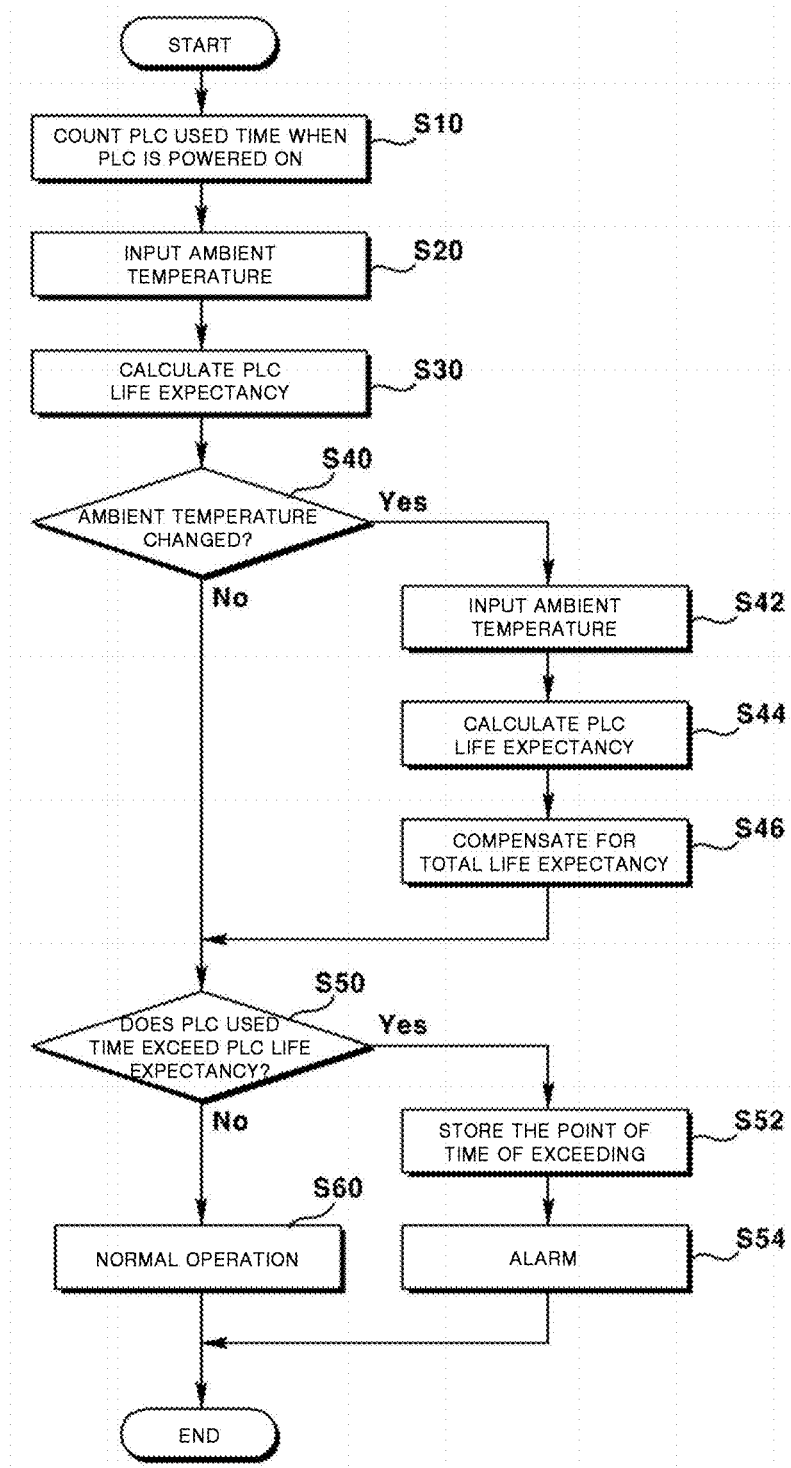
FIG. 4 is a flow chart showing a PLC life diagnosing method according to one embodiment of the present disclosure.

FIG. 4 is a flow chart showing a PLC life diagnosing method according to one embodiment of the present disclosure.

First, when the PLC is powered on, the PLC used time is counted (S10) and a user inputs an ambient temperature (S20). At this time, as described above, the temperature sensors may be used to sense the ambient temperature, instead of manual temperature input by the user. When the ambient temperature is input manually or is sensed by the temperature sensors, the PLC life expectancy depending on the ambient temperature is calculated (S30). This calculation can be made according to the above equation 1.

Next, it is determined whether or not the ambient temperature is changed (S40). If the ambient temperature is not changed (No in S40), it is determined whether or not the PLC used time exceeds the calculated PLC life expectancy (S50). If the ambient temperature is changed (Yes in S40), the ambient temperature is again input (S42), the PLC life expectancy depending on the input ambient temperature is again calculated (S44), and the PLC life expectancy calculated at S30 is compensated for and is updated (S46).

If the PLC used time exceeds the calculated PLC life expectancy (Yes in S50), the point of time when the PLC used time exceeds the PLC life expectancy is stored in a PLC system history (S52) and an alarm indicating that the PLC used time exceeds the PLC life expectancy is displayed or notified to the user (S54). This alarm can be made by displaying on the display unit 40 a phrase indicating that the PLC used time exceeds the PLC life expectancy, by sounding an alarm through a speaker, or by turning on an LED lamp for alarm.

The operation (S52) of storing the point of time of exceeding in the PLC system history is not essential in practicing some embodiments of the present disclosure but may help to confirm the point of time of exceeding later.

According to the above embodiments of the present disclosure, it is possible to diagnose a PLC life expectancy depending on a temperature and predict breakdown of the PLC. In addition, according to one embodiment of the present disclosure, it is possible to check a PLC state in real time through an LED.

In addition, according to one embodiment of the present disclosure, since a PLC history can be utilized to trace back a time for which the PLC used time exceeds the PLC life expectancy, it is possible to perform breakdown diagnosis and system maintenance with high efficiency. Moreover, according to one embodiment of the present disclosure, when a temperature controller is incorporated in the PLC later, it is possible to automatically measure an ambient temperature without manual temperature by a user and make an automatic diagnosis on the PLC life.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A Programmable Logic Controller (PLC) apparatus comprising:
an input unit configured to receive, from a user, an ambient temperature of a PLC;
a memory configured to store a life expectancy of a part depending on the ambient temperature, wherein the part is a capacitor;
a diagnosing unit configured to predict a PLC life expectancy according to the following equation, $$L=T-10\times\mathrm{Log}_2 Lo/Lc$$

where, L comprises the PLC life expectancy, T comprises a part maximum use temperature, Lo comprises a PLC reference life, and Lc comprises a part life at a corresponding temperature, to calculate a PLC residual life by subtracting a PLC used time from the PLC life expectancy, and to compare the PLC used time and the PLC life expectancy to determine whether or not the PLC used time exceeds the PLC life expectancy;
a control unit configured to control an operation of the input unit, the memory and the diagnosing unit and to store a point of time in the memory when the PLC residual life becomes zero; and
an alarm unit configured to produce an alarm sound or alarm light, wherein the control unit is configured to control the alarm unit to be operated if the PLC used time exceeds the PLC life expectancy.

2. The PLC apparatus according to claim 1, wherein the diagnosing unit includes a timer configured to count the PLC used time.

3. The PLC apparatus according to claim 1 comprising a display unit configured to display the PLC residual life under control of the control unit.

4. A Programmable Logic Controller (PLC) apparatus comprising:
a sensor unit configured to sense an ambient temperature of a PLC;
a memory configured to store a life expectancy of a part depending on the ambient temperature, wherein the part is a capacitor;
a diagnosing unit configured to predict a PLC life expectancy according to the following equation, $$L=T-10\times\mathrm{Log}_2 Lo/Lc$$

where, L comprises the PLC life expectancy, T comprises a part maximum use temperature, Lo comprises a PLC reference life, and Lc comprises a part life at a corresponding temperature, to calculate a PLC residual life by subtracting a PLC used time from the PLC life expectancy, and to compare the PLC used time and the PLC life expectancy to determine whether or not the PLC used time exceeds the PLC life expectancy; and
a control unit configured to control an operation of the input unit, the memory and the diagnosing unit and to store a point of time in the memory when the PLC residual life becomes zero; and
an alarm unit configured to produce an alarm sound or alarm light, wherein the control unit is configured to control the alarm unit to be operated if the PLC used time exceeds the PLC life expectancy.

* * * * *